United States Patent [19]
Oliva

[11] Patent Number: 6,078,279
[45] Date of Patent: Jun. 20, 2000

[54] ELECTROMAGNETIC SIGNAL DETECTOR WITH MUTE FEATURE

[75] Inventor: David Carter Oliva, Chicago, Ill.

[73] Assignee: Cobra Electronics, Chicago, Ill.

[21] Appl. No.: 09/111,817

[22] Filed: Jul. 8, 1998

[51] Int. Cl.[7] .................................................. G01S 7/40
[52] U.S. Cl. .............................................................. 342/20
[58] Field of Search ............................. 342/20; 340/506,
340/902; 455/228, 229

[56] References Cited

U.S. PATENT DOCUMENTS

| | | | |
|---|---|---|---|
| 3,673,560 | 6/1972 | Barsh et al. | 340/33 |
| 3,772,641 | 11/1973 | Grosser et al. | 340/33 |
| 3,784,970 | 1/1974 | Simpkin | 340/33 |
| 3,997,868 | 12/1976 | Ribnick et al. | 340/33 |
| 4,024,475 | 5/1977 | Brägas et al. | 343/200 |
| 4,196,412 | 4/1980 | Sluis et al. | 340/32 |
| 4,216,545 | 8/1980 | Flickshu et al. | 455/77 |
| 4,443,790 | 4/1984 | Bishop | 340/539 |
| 4,541,119 | 9/1985 | Cooper et al. | 455/57 |
| 4,631,542 | 12/1986 | Grimsley | 342/20 |
| 4,717,904 | 1/1988 | Murakami | 340/52 H |
| 4,764,978 | 8/1988 | Argo et al. | 455/1 |
| 4,794,394 | 12/1988 | Halstead | 340/902 |
| 4,847,589 | 7/1989 | Dobbins | 340/326 |
| 5,021,780 | 6/1991 | Fabiano et al. | 340/994 |
| 5,049,884 | 9/1991 | Jaeger et al. | 342/20 |
| 5,091,906 | 2/1992 | Reed et al. | 370/94.1 |
| 5,164,729 | 11/1992 | Decker et al. | 342/20 |
| 5,181,027 | 1/1993 | Shafer | 340/961 |
| 5,235,329 | 8/1993 | Jackson | 340/902 |
| 5,289,181 | 2/1994 | Wantanabe et al. | 340/902 |
| 5,300,932 | 4/1994 | Valentine et al. | 342/20 |
| 5,307,060 | 4/1994 | Pervulsky et al. | 340/902 |
| 5,402,117 | 3/1995 | Zijderhand | 340/905 |
| 5,495,242 | 2/1996 | Kick et al. | 340/902 |
| 5,497,148 | 3/1996 | Oliva | 340/905 |
| 5,534,847 | 7/1996 | McGregor | 340/432 |
| 5,554,982 | 9/1996 | Shirkey et al. | 340/903 |
| 5,559,508 | 9/1996 | Orr et al. | 340/902 |
| 5,594,432 | 1/1997 | Oliva et al. | 340/905 |
| 5,635,920 | 6/1997 | Pogue et al. | 340/901 |

*Primary Examiner*—Ian J. Lobo
*Attorney, Agent, or Firm*—Wallenstein & Wagner, Ltd.

[57] ABSTRACT

An electromagnetic signal detector with a means for detecting a first electromagnetic signal within a plurality of bands of frequencies, generating an alarm signal in response, and reinitiating an alarm signal for a second subsequent signal in one of said band of frequencies different from said first electromagnetic signal detection, is provided. The alarm signal response can be muted. The audible alarm signal reinitiates at any point in an alarm signal generation, even during muting, if a second subsequent electromagnetic signal of a different frequency band is detected.

8 Claims, 1 Drawing Sheet

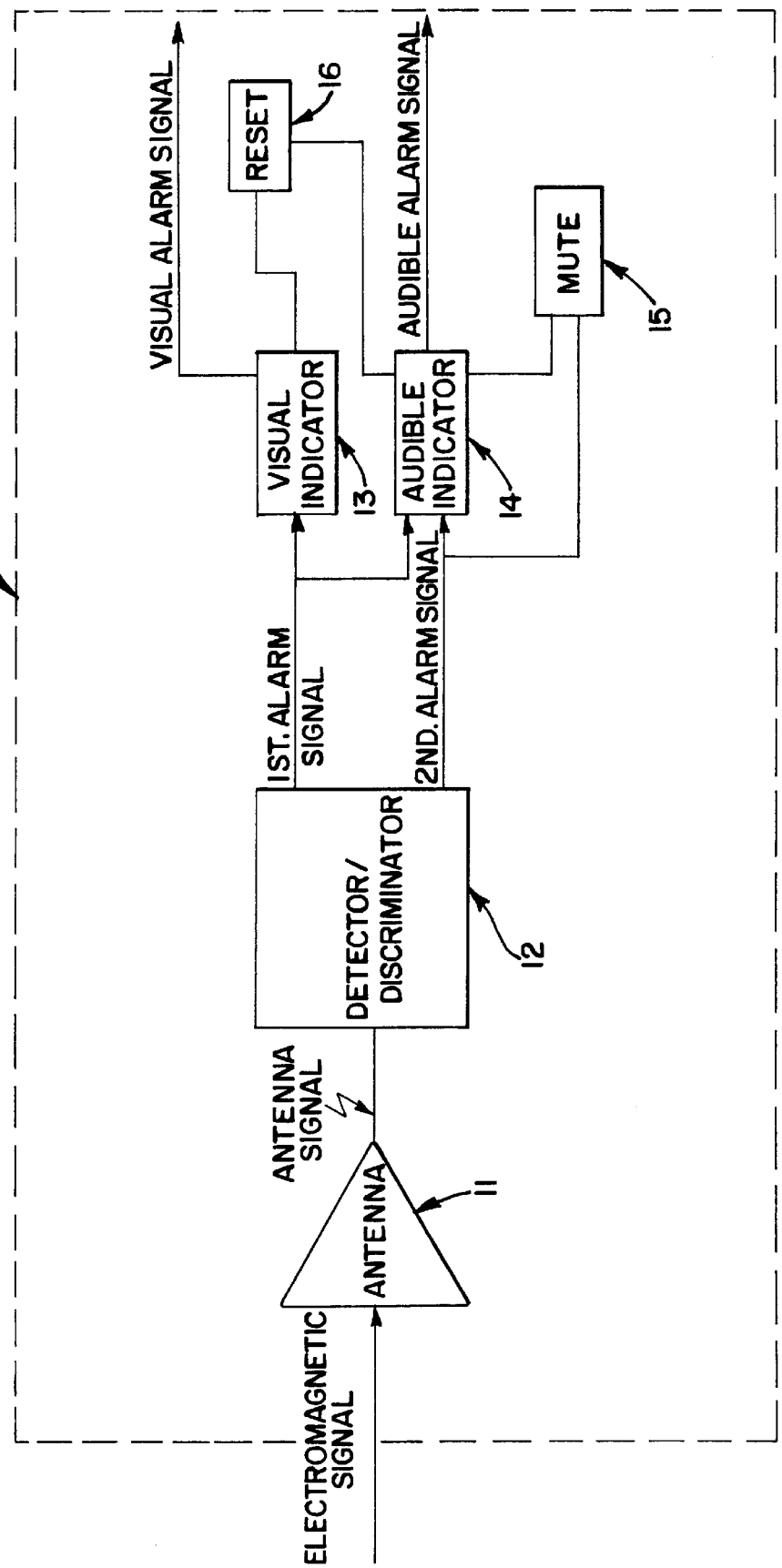
Figure

ELECTROMAGNETIC SIGNAL DETECTOR WITH MUTE FEATURE

TECHNICAL FIELD

Applicant's invention relates to an electromagnetic signal detector, such as a police radar detector, with a mute feature, and more particularly, to a signal detector which reinitiates a muted alarm upon detection of a second, subsequent signal.

BACKGROUND PRIOR ART

Various systems have been proposed to alert a driver to the presence of an electromagnetic signal such as that in police radar.

Decker et al., U.S. Pat. No. 5,164,729, is directed to a police radar detector which includes an auto-mute feature by which a driver may be alerted to the presence of police radar but without an unnecessarily prolonged audible alarm. Upon the detection of a police radar signal, an audible alarm begins to beep at a selected intensity and at a beep rate corresponding to the strength of the signal. At a time after detection of the police radar signal, the intensity of the audible alarm is automatically reduced.

Grimsley, U.S. Pat. No. 4,631,542, is directed to a radar warning receiver having an alarm indicator responsive to an electronic switch, the switch being activated and energizing the alarm in response to an alarm signal indicating the presence of a police radar signal, the switch being deactivated and de-energizing the alarm in response to a mute signal occurring during the occurrence of the alarm signal, the switch remaining deactivated until the alarm condition signal terminates and subsequently reoccurs.

SUMMARY OF THE INVENTION

It is an object of the invention to provide an electromagnetic signal detector for detecting an electromagnetic signal such as police radar. The signal detector generates both visual and audible alarms upon receipt of the electromagnetic signal, permits muting of the audible alarm, and reinitiates the audible alarm-during the muting when another electromagnetic signal is detected.

In accordance with the invention the electromagnetic detector includes means for detecting a first electromagnetic signal within a plurality of bands of frequencies, generating an alarm signal upon detection of the electromagnetic signal, generating both visual and audible alarm signals in response to said alarm signal, and subsequently, muting said audible alarm signal. The detector will reinitiate the audible alarm signal during said muting upon detection of a second, subsequent electromagnetic signal located in one of said band of frequencies different from said first electromagnetic signal.

BRIEF DESCRIPTION OF THE DRAWING

FIG. 1 is a block diagram of an electromagnetic signal detector according to the present invention.

DETAILED DESCRIPTION OF THE PREFERRED EMBODIMENT

While this invention is susceptible of embodiments in many different forms, there will herein be described in detail a preferred embodiment of the invention with the understanding that the present disclosure is to be considered as an exemplification of the principles of the invention and is not intended to limit the broad aspects of the invention of the embodiments illustrated.

The figure is a block diagram of an electromagnetic signal detector designated 10 in accordance with the present invention. The detector 10 includes an antenna 11 which is coupled to a detector/discriminator 12 of the detector 10. A visual indicator 13 is coupled to the detector 10 and provides a visual recognition of an alarm signal. In addition, an audible indicator 14 is coupled to the detector 10 and provides an audible indication of an alarm signal. A muting circuit 15 is coupled to the audible indicator 14 to mute the audible alarm. Also, a reset feature 16 is coupled to both the audible and visual indicators and resets both indicators, either manually or automatically.

The antenna 11, which is generally employed as a reception antenna, is tuned to a specific range, or bands of frequencies which are being detected. Conventional radar-type speed measuring equipment employs a variety of microwave frequency bands, e.g., 10 GHz band (X band), 24 GHz band (K band) and 35 GHz band (Ka band). An electromagnetic signal is received by the antenna 11 and, through internal signal conditioning, an antenna signal is generated to the detector/discriminator 12. The detector/discriminator 12 is capable of detecting signals within a plurality of bands of frequencies and generating an alarm signal in response to said electromagnetic signal detection regardless of the frequency band. The detector/discriminator 12 will generate a $1^{st}$ alarm signal in response to the antenna signal prompted by the detected electromagnetic signal. The $1^{st}$ alarm signal generated by the detector/discriminator 12 will be received and displayed on the visual indicator 13 and audiblized on the audible indicator 14 simultaneously. The muting circuit 15 will then begin muting the audible alarm signal either manually or automatically. If another electromagnetic signal is detected, of another frequency, either during or after the muting of the audible alarm signal, a $2^{nd}$ alarm signal is generated by the detector/discriminator 12, the muting of the audible alarm signal is automatically stopped by the muting circuit 15, the audible indicator is reset by the reset feature 16, and a new audible alarm signal is initiated. This permits the reinitiation of an audible alarm signal in response to the generation of a $2^{nd}$ alarm signal received from the detector/discriminator 12 from the detection of a second different electromagnetic signal, which is operating in the X-band, K-band or Ka-band. Thus, the detector 10 can detect and respond simultaneously, to electromagnetic signals that are of the radar and laser varieties.

It will be understood that the invention may be embodied in other specific forms without departing from the spirit or central characteristics thereof. The present embodiment, therefore, is to be considered in all respects as illustrative and not to be limited to the details given herein.

What I claim is:

1. A signal detector for detecting an electromagnetic signal, generating an alarm signal upon detection of the electromagnetic signal, generating an alarm in response to said alarm signal and subsequently muting the alarm during the presence of said alarm signal, the detector including means for reinitiating the alarm upon detection of a subsequent electromagnetic signal during said muting.

2. A signal detector for detecting a first electromagnetic signal within a plurality of bands of frequencies, generating an alarm signal upon detection of the electromagnetic signal, generating an alarm in response to said alarm signal, and subsequently muting the alarm, during the presence of said alarm signal, the detector including means for reinitiating the alarm during said muting upon detection of a second, subsequent electromagnetic signal located in one of said band of frequencies different from said first electromagnetic signal.

3. The signal detector of claim 2, wherein said detector includes an antenna which is specifically tuned to detect bands of frequencies in the electromagnetic signal.

4. The signal detector of claim 2, wherein said detector includes a detector/discriminator for differentiating between the bands of frequencies.

5. The signal detector of claim 2, wherein the detector includes a visual indicator to generate a visual alarm signal.

6. The signal detector of claim 2, wherein the detector includes an audible indicator to generate an audible alarm signal.

7. The signal detector of claim 2, wherein the detector includes a mute feature to mute the audible alarm signal.

8. The signal detector of claim 2, wherein the detector includes a reset feature to reset both the visual and audible indicators.

* * * * *